US 6,630,965 B1

(12) United States Patent
Xue et al.

(10) Patent No.: US 6,630,965 B1
(45) Date of Patent: Oct. 7, 2003

(54) FIELD FREEZE FILTER IMPLEMENTATION

(75) Inventors: Ning Xue, Fremont, CA (US); Darren D. Neuman, San Jose, CA (US); Gregg Dierke, San Jose, CA (US)

(73) Assignee: LSI Logic Corporation, Milpitas, CA (US)

( * ) Notice: Subject to any disclaimer, the term of this patent is extended or adjusted under 35 U.S.C. 154(b) by 430 days.

(21) Appl. No.: 09/794,852

(22) Filed: Feb. 27, 2001

(51) Int. Cl.[7] ................................. H04N 5/44
(52) U.S. Cl. .................. 348/559; 348/560; 348/553
(58) Field of Search ..................... 348/559, 553, 348/560, 714, 448, 458, 22, 607, 14.14; 382/236, 240, 282, 299; H04N 5/44, 9/64, 7/01, 11/20

(56) References Cited

U.S. PATENT DOCUMENTS

| 4,679,084 A | * | 7/1987 | Topper et al. ............... 348/559 |
| 4,855,813 A | * | 8/1989 | Russell et al. ............... 348/559 |
| 5,117,289 A | * | 5/1992 | Farley et al. ................. 348/443 |
| 6,069,662 A | * | 5/2000 | Horiuchi et al. ............. 348/446 |
| 6,289,132 B1 | * | 9/2001 | Goertzen ..................... 382/240 |

FOREIGN PATENT DOCUMENTS

JP            01274574        * 11/1989

* cited by examiner

Primary Examiner—Sherrie Hsia
(74) Attorney, Agent, or Firm—Christopher P. Maiorana, PC

(57) ABSTRACT

A circuit for freezing a video frame having a first field interlaced with a second field. The circuit generally comprises a memory and a filter. The memory may be configured to present a plurality of coefficient signals that define (i) a first coefficient set for the first field and (ii) a second coefficient set for the second field. The filter may be configured to present a new frame in place of the video frame. The new frame may be generated from either (i) the first field and the first coefficient set in response to freezing on the first field or (ii) the second field and the second coefficient set in response to freezing on the second field.

18 Claims, 4 Drawing Sheets

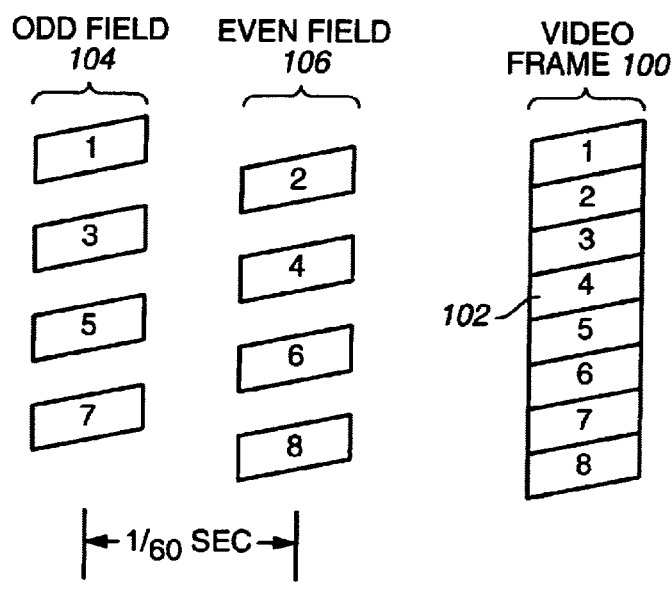
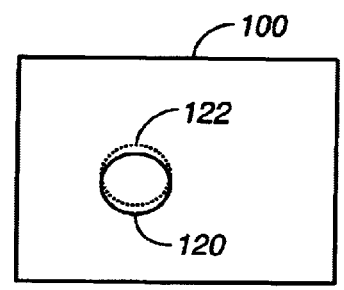
FIG._1
FIG._5
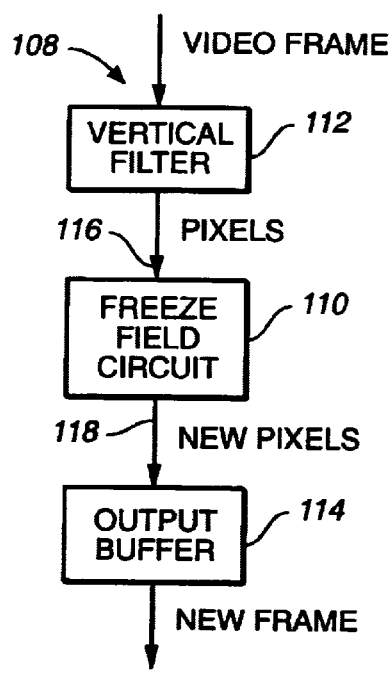
FIG._2
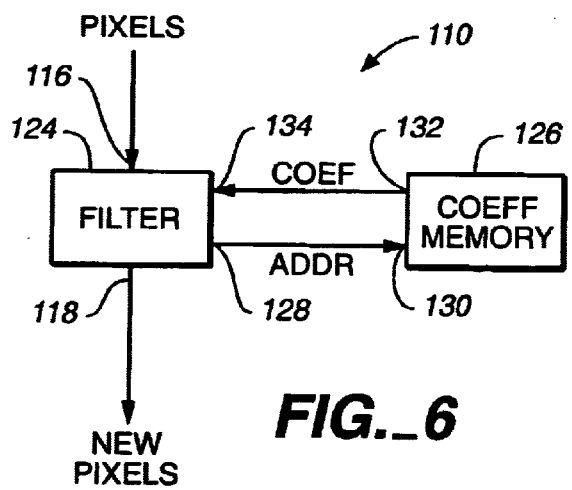
FIG._6

| LINE | NEW Y ODD FIELD | NEW Y EVEN FIELD | NEW C ODD FIELD | NEW C EVEN FIELD |
|---|---|---|---|---|
| 1 | 1xY1+0xY3 | | 1xC1+0C3 | |
| 2 | | 5/8Y1+3/8Y3 | | 15/16C1+1/16C3 |
| 3 | 1/8Y1+7/8Y3 | | 11/16C1+5/16C3 | |
| 4 | | 5/8Y3+3/8Y5 | | 7/16C1+9/16C3 |
| 5 | 1/8Y3+7/8Y5 | | 3/16C1+13/16C3 | |
| 6 | | 5/8Y5+3/8Y7 | | 15/16C3+1/16C5 |
| 7 | 1/8Y5+7/8Y7 | | 11/16C3+5/16C5 | |
| 8 | | 5/8Y7+3/8Y9 | | 7/16C3+9/16C5 |
| ⋮ | ⋮ | ⋮ | ⋮ | ⋮ |
| 476 | | 5/8Y475+3/8Y477 | | 7/16C237+9/16C239 |
| 477 | 1/8Y475+7/8Y477 | | 3/16C237+13/16C239 | |
| 478 | | 5/8Y477+3/8Y479 | | 1xC239+0 |
| 479 | 1/8Y477+7/8Y479 | | 1xC239+0 | |
| 480 | | 1xY479+0+Y480 | | 1xC239+0 |

FIG._3

| LINE | NEW Y ODD FIELD | NEW Y EVEN FIELD | NEW C ODD FIELD | NEW C EVEN FIELD |
|---|---|---|---|---|
| 1 | 1xY2+0xY4 | | 1xC2+0xC4 | |
| 2 | | 7/8Y2+1/8Y4 | | 1xC2+0xC4 |
| 3 | 3/8Y2+5/8Y4 | | 1xC2+0xC4 | |
| 4 | | 7/8Y4+1/8Y6 | | 13/16C2+3/16C4 |
| 5 | 3/8Y4+5/8Y6 | | 9/16C2+7/16C4 | |
| 6 | | 7/8Y6+1/8Y8 | | 5/16C2+11/16C4 |
| 7 | 3/8Y6+5/8Y8 | | 1/16C2+15/16C4 | |
| 8 | | 7/8Y8+1/8Y10 | | 13/16C4+3/16C6 |
| ⋮ | ⋮ | ⋮ | ⋮ | ⋮ |
| 476 | | 7/8Y476+1/8Y478 | | 13/16C238+3/16C240 |
| 477 | 3/8Y476+5/8Y478 | | 9/16C238+7/16C240 | |
| 478 | | 7/8Y478+1/8Y480 | | 5/16C238+11/16C240 |
| 479 | 3/8Y478+5/8Y480 | | 1/16C238+15/16C240 | |
| 480 | | 1xY470+0 | | 1xC240+0 |

FIG._4

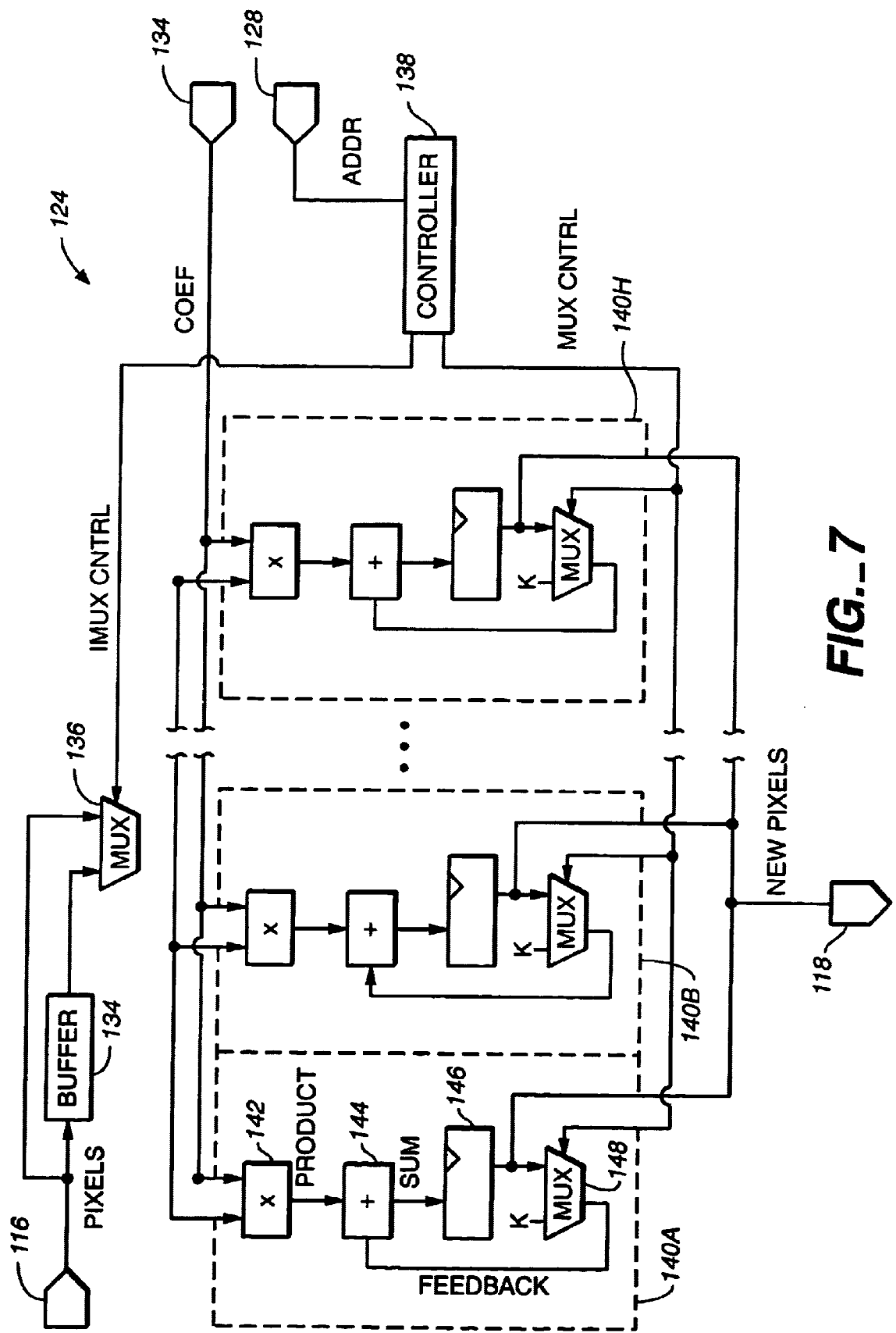
FIG._7

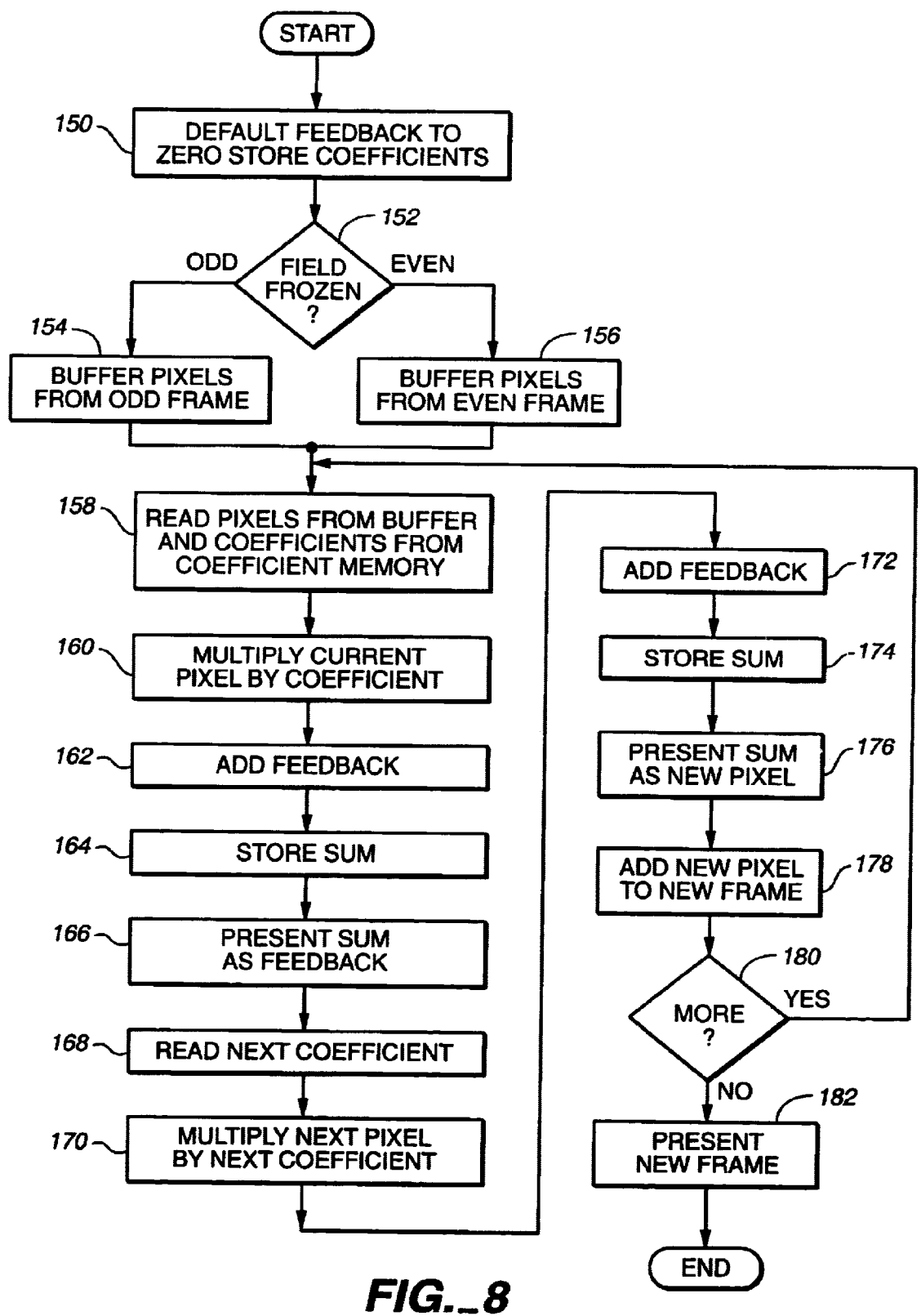
FIG._8

FIELD FREEZE FILTER IMPLEMENTATION

Field of the Invention

The present invention relates to a method and/or architecture for implementing a video field freeze filter generally and, more particularly, to generating a new frame from only one of two interlaced fields in an original frame.

Background of the Invention

Pictures presented in a Motion Picture Expert Group (MEPG) standard video format are frame-based or field-based. The frame-based video means that each frame contains two interlaced field images that are sampled at the same time. The field-based video means that each frame contains two interlaced field images that are sampled at different times. The field-based frames compliant with the National Television Systems Committee (NTSC) standards sample a new field every 1/60th of a second. Consequently, the two fields that comprise one frame are slightly shifted in time with respect to each other.

The time shift between the two fields of the one frame can cause distortion when both fields are repeated over and over to freeze the one frame. If an object appearing in the frame is moving relatively rapidly, then the object will appear in each of the two fields in different positions. When the two fields are repeated to freeze the frame, the object appears spatially distorted along the direction of motion and can even appear to flicker.

One approach that has been used to eliminate the spatial distortion is to display only one of the two fields when freezing the frame. A consequence of not displaying one of the two fields is that vertical resolution in the frame is reduced. Another approach that has been used to freeze the frame is aimed at eliminating the flickering and loss of intensity. Here, one of the two fields is replaced by a copy of the other field for display purposes. Since the displayed field and the copy of the displayed field have effectively the same sample time then there is no blurring of fast-moving objects. However, vertical resolution of the frame is still degraded. Furthermore, some objects, such as alphanumeric characters change noticeably in appearance as horizontal features double in height.

Summary of the Invention

The present invention concerns a circuit for freezing a video frame having a first field interlaced with a second field. The circuit generally comprises a memory and a filter. The memory may be configured to present a plurality of coefficient signals that define (i) a first coefficient set for the first field and (ii) a second coefficient set for the second field. The filter may be configured to present a new frame in place of the video frame. it The new frame may be generated from (i) the first field and the first coefficient set in response to freezing on the first field and (ii) the second field and the second coefficient set in response to freezing on the second field.

The objects, features and advantages of the present is, invention include providing a method and/or architecture that may (i) freeze a 2:1 interlaced video frame based upon a single point in time, (ii) maintain an approximately normal intensity in the frozen frame, and/or (iii) maintain an approximately normal vertical resolution in the frozen frame.

Brief Description of the Drawings

These and other objects, features and advantages of the present invention will be apparent from the following detailed description and the appended claims and drawings in which:

FIG. 1 is a diagram of a portion of an interlaced video frame;

FIG. 2 is a block diagram of a portion of a video system implementing the present invention;

FIG. 3 is a table of coefficients for an odd field;

FIG. 4 is a table of coefficients for an even field;

FIG. 5 is an illustration of an object in the video frame;

FIG. 6 is a block diagram of a freeze frame circuit;

FIG. 7 is a detailed block diagram of a filter within the freeze frame circuit; and FIG. 8 is a flow diagram of a method for freezing the video frame.

Detailed Description of the Preferred Embodiments

Referring to FIG. 1, a diagram of a portion of a video frame 100 implementing a preferred embodiment of the present invention is shown. The video frame 100 generally comprises multiple lines 102 of information. Only eight lines 102 are shown in FIG. 1 for clarity. Generally there are more than eight lines 102 in each video frame 100. The lines 102 may be arranged basically horizontally across the video frame 100.

The video frame 100 is generally vertically interlaced 2:1 by two fields. One field 104 generally contains odd-numbered lines 102. A second field 106 generally contains even-numbered lines 102. Consequently, the field 104 may be referred to hereinafter as an odd field 104 and the field 106 may be referred to as an even field 106. Creation of the odd field 104 may be separated in time from creation of the even field 106. Generally there is approximately a 1/60th of a second period between starts of consecutive fields. Since each video frame 100 may comprise one odd field 104 and one even field 106, the video frame 100 may have a period of approximately 1/30th of a second.

Referring to FIG. 2, a block diagram of a portion of a video system 108 implementing the present invention is shown. The video system 108 may be implemented as part of a digital video disc (DVD) player, a digital video broadcast-satellite (DVB-S) receiver, and/or other similar video systems where the video is present in digital format. A preferred embodiment of the present invention may be implemented as a freeze field circuit 110 disposed between a vertical filter 112 and a line or output buffer 114.

The freeze field circuit 110 may have an input 116 for receiving a signal (e.g., PIXELS) from the vertical filter 112. The signal PIXELS may be a portion of a signal (e.g., VIDEO FRAME) received by the vertical filter 112. The signal VIDEO FRAME may be implemented as a 2:1 vertically interlaced video frame 100 having an odd field 104 and an even-field 106. The freeze field circuit 110 may have an output 118 for presenting a signal (e.g., NEW PIXELS) to the output buffer 114. The signal NEW PIXELS may be a portion of a signal (e.g., NEW FRAME) presented by the output buffer 114. The signal NEW FRAME may also be implemented as another 2:1 vertically interlaced video frame 100 having a new odd field 104' and a new even field 106'.

During normal operation of the video system 108, the freeze field circuit 110 generally presents the signal NEW PIXELS as an unmodified copy of the signal PIXELS. As a result, the new odd field 104' and the new even field 106' in the signal NEW FRAME may be identical to the odd field 104 and the even field 106 respectively in the signal VIDEO FRAME. When freezing the signal VIDEO FRAME, the video frame 100 within the signal VIDEO FRAME may be stopped on either the odd field 104 or the even field 106. When freezing the signal VIDEO FRAME, the freeze field circuit 110 generally uses only the field that the video frame 100 freezes on (e.g., the odd field 104 or the even field 106) to generate the signal NEW PIXELS. Here, the new odd field 104' and the new even field 106' in the signal NEW PIXELS may be different from the odd field 104 and the even field 106 respectively in the signal VIDEO FRAME. The signal NEW FRAME may then be used for display purposes.

Referring to FIG. 3, a table illustrating an example of coefficients for the odd field 104 is shown. A collection of the coefficients shown may be referred to as an odd coefficient set. Generally, the signal VIDEO FRAME and the signal NEW FRAME include intensity and color information. In a preferred embodiment of the present invention, the luminance and color information may be described in terms of a YUV approach. The term "Y" generally identifies a luminance component. The terms "U" and "V" generally identify chrominance components. The terms "U" and "V" are generically represented by a term "C" in FIG. 3.

Each term "Y" and "C" in the table are followed by an identifier number. For the luminance components, the identifier number may be the line number of the video frame 100 in the signal VIDEO FRAME. For the chrominance components, the identifier number may be a top-to-bottom ordering of the chrominance data within the video frame 100 in the signal VIDEO FRAME.

The coefficients shown in FIG. 3 are generally based upon a 4:2:0 ratio type video frame 100. Consequently, there may be only half as much chrominance information as luminance information. However, other luminance/chrominance ratios may be used to meet the design criteria of a particular application. For example, a 4:2:2 ratio may be used wherein the coefficients for the chrominance may be the same as the coefficients for the luminance. The coefficients are also generally based upon a 480 active line video frame 100. Other numbers of lines within the video frame 100 may be implemented to meet the design criteria of a particular application.

Referring to FIG. 4, a table illustrating an example of coefficients for the even field 106 is shown. A collection of the coefficients shown may be referred to as an even coefficient set. The coefficients for the even field 106 are generally different from the coefficients for the odd field 104 shown in FIG. 3. For example, the new Y odd field coefficients for the $5^{th}$ line may have one value (e.g., $\frac{7}{8}$, $\frac{1}{8}$) for the odd field 104 and another value (e.g., $\frac{3}{8}$, $\frac{5}{8}$) for the even field 106. An effect of the odd field 104 coefficients may be to raise the $5^{th}$ line in the signal NEW FRAME upward by $\frac{1}{8}^{th}$ of a vertical line as compared to the $5^{th}$ line in the signal VIDEO FRAME. In contrast, an effect of the even field 106 coefficients may be to lower the $5^{th}$ line in the signal NEW FRAME downward by $\frac{1}{8}^{th}$ of a vertical line.

Referring to FIG. 5, an illustration of an object 120 in the video frame 100 is shown. Here the object 120 is generally shown with a solid line to represent the object 120 as captured in the signal VIDEO FRAME prior to processing by the freeze field circuit 110. FIG. 5 is generally shown with the video frame 100 having been frozen on the odd field 104. As a result, the odd field 104 coefficients may be used to generate the signal NEW FRAME. An object 122 may appear in the signal NEW FRAME as a result of the processing performed by the freeze field circuit 110. The object 122 may have the same basic spatial shape as the object 120. However, the object 122 may appear to be shifted a fraction of a vertical line above the object 120. A similar fraction of a vertical line shift downward may appear had the video frame 100 been frozen on the even field 106.

Referring to FIG. 6, a block diagram of the freeze field circuit 110 in accordance with a preferred embodiment of the present invention is shown. The freeze field circuit 110 generally comprises a filter 124 and a coefficient memory 126. The filter 124 may include the input 116 for receiving the signal PIXELS and the output 118 for presenting the signal NEW PIXELS. The filter 124 may also include an output 128 for presenting a signal (e.g., ADDR) to an input 130 of the coefficient memory 126. The coefficient memory 126 may have an output 132 for presenting a signal (e.g., COEF) to an input 134 of the filter 124.

The coefficient memory 126 may be used to store the coefficients for luminance, chrominance, or both. In a preferred embodiment of the present invention, there may be two freeze field circuits 110, one for luminance and another for chrominance. In the two freeze field circuit 110 embodiment, one coefficient memory 126 may store only luminance coefficients "Y" and the other coefficient memory 126 may store only chrominance coefficients "C".

The signal ADDR may be implemented as a control or an address signal. The filter 124 may present the signal ADDR to the coefficient memory 126 to identify a selected coefficient for the coefficient memory 126 to present. The signal COEF may be implemented as a coefficient signal. The signal COEF may be capable of conveying the coefficients shown in FIG. 3 and FIG. 4 to the filter 124.

Referring to FIG. 7, a detailed block diagram of an embodiment of the filter 124 is shown. The filter 124 generally comprises a buffer 134, an input multiplexer 136, a controller 138, and multiple circuits 140A–H. Each of the multiple circuits 140A–H generally comprises a multiplier 142, an adder 144, a register 146, and a multiplexer 148.

The buffer 134 may be connected to the input 116 to receive the signal PIXELS. The buffer 134 may have an output for presenting the signal PIXELS as buffered. In a preferred embodiment of the present invention, the buffer 134 may be implemented as a 96 by 64 bit random access memory (RAM). In one example, the buffer 134 may receive and present the signal PIXELS as a 64-bit wide signal containing 8 pixels with 8-bits per pixel.

The input multiplexer 136 may have an input connected to the output of the buffer 134 to receive the buffered signal PIXELS and another input connected to the input 116 to receive the signal PIXELS directly. The input multiplexer 136 may have an output to present either the buffered or the unbuffered signal PIXELS to each multiplier 142 of each circuit 140A–H. The input multiplexer 136 may have an input for receiving a signal (e.g., IMUXCNTRL) from the controller 138. The signal IMUXCNTRL may be implemented as a control signal. The signal IMUXCNTRL may control which input of the input multiplexer 136 is directed to the output of the input multiplexer 136.

The controller 138 may have an output for presenting the signal IMUXCNTRL to the input multiplexer 136. The controller may have another output for presenting the signal ADDR to the coefficient memory 126. The controller 138 may have a third output for presenting a signal (e.g., MUXCNTRL) to the multiplexer 148 of each circuit 140A–H. The signal MUXCNTRL may be implemented as a control signal.

The multiplier 142 in each circuit 140A–H may have an input for receiving one pixel at a time of the signal PIXELS.

The multiplier 142 may have a second input for receiving the signal COEF. An output of the multiplier 142 may present a signal (e.g., PRODUCT). The signal PRODUCT may be implemented as a product equal to the pixel multiplied by the coefficient. In a preferred embodiment of the present invention, the signal COEF may be implemented as a 4-bit signal and each pixel as 8-bits. The signal PRODUCT may thus be implemented as a 12-bit signal.

The adder 144 in each circuit 140A–H may have an input for receiving the signal PRODUCT from the multiplier 142. The adder 144 may have a second input for receiving a signal (e.g., FEEDBACK) from the multiplexer 148. The signal FEEDBACK may be implemented as a feedback signal. An output of the adder 144 may present a signal (e.g., SUM) to the register 146. The signal SUM may be implemented as a sum of the signal PRODUCT and the signal FEEDBACK. In a preferred embodiment of the present invention, the signal FEEDBACK may be implemented as a 12-bit signal to match the 12-bits of the signal PRODUCT. The signal SUM may be implemented as a 13-bit signal.

The register 146 in each circuit 140A–H may have an input for receiving the signal SUM. An output of the register 146 may be provided to present the signal SUM as stored. In a preferred embodiment of the present invention, the register 146 may be implemented as a 13-bit wide register to accommodate the 13-bit width of the signal SUM.

The multiplexer 148 in each circuit 140A–H may have an input for receiving the signal SUM as presented by the register 146. The multiplexer 148 may have a second input for receiving a signal (e.g., K). The signal K may be implemented as a constant signal. The signal K may have a constant value of zero. The multiplexer 148 may have a third input for receiving the signal MUXCNTRL. The multiplexer 148 may have an output for presenting the signal FEEDBACK. The multiplexer 148 may use the signal MUXCNTRL to control which input is routed to the output. In a preferred embodiment of the present invention, the multiplexer 144 may receive only the 12 most significant bits of the signal SUM. Consequently, the multiplexer 148 may present the signal FEEDBACK as a 12-bit signal.

The output of each register 146 may be connected to the Is output 118 of the freeze field circuit 110. When the signal SUM contains the sum of two pixels from adjacent lines of the video frame 100, the signal SUM may contain a new pixel. Each output of each register 146 of each circuit 140A–H may be concatenated to form the signal NEW PIXELS. In a preferred embodiment, the eight most significant bits of the signal SUM may be used to represent the new pixel. The concatenation of eight new pixels may present the signal NEW PIXELS as a 64-bit signal. Other embodiments of the present invention may implement more or fewer than eight copies of the circuit 140. Additional copies of the circuit 140 may be employed to increase the number of pixels processed in parallel through the freeze filter circuit 110.

Referring to FIG. 8, a flow diagram of a method of operating the filter 124 is shown. The operation is generally illustrative of processing luminance information. The same process may be applied to chrominance information.

The operation generally begins by initializing the signal FEEDBACK to a zero value and storing the coefficients in the coefficient memory 126 (e.g., block 150). Once the signal VIDEO FRAME has been frozen, a determination may be made whether the signal VIDEO FRAME was frozen on an odd field 104 or an even field 106 (e.g., decision block 152). When the signal VIDEO FRAME was frozen on an odd field 104 (e.g., the ODD branch from decision block 152), a first group of pixels from the odd field 104 may be buffered (e.g., block 154). When the signal VIDEO FRAME was frozen on an even field 106 (e.g., the EVEN branch from decision block 152), a first group of pixels from the even field 106 may be buffered (e.g., block 156).

The first set of pixels may then be read from the buffer 136 along with the first coefficient (e.g., block 158). The coefficient may be read from the odd coefficient set when freezing on the odd field 104 and read from the even coefficient set when freezing on the even field 106. Each multiplier 142 may multiply the pixel and the coefficient to present the signal PRODUCT (e.g., block 160). Each adder 144 may add the signal PRODUCT to the signal FEEDBACK to present the signal SUM (e.g., block 162). Each register 146 may receive, store, and present the signal SUM (e.g., block 164). Each multiplexer 148 may then select between the signal SUM as stored and the signal K to present the signal FEEDBACK (e.g., block 166). By block 168 the first half of a new pixel has been calculated (e.g., $3/8*Y3_i+0$, where i indicates a particular pixel in the line Y3).

The next coefficient may then be read from the coefficient memory 126 (e.g., block 168). The multipliers 142 may multiply the next set of pixels with by the next coefficients to present the signals PRODUCT (e.g., block 170). The adders 144 may add the signals PRODUCT to the signals FEEDBACK to present the signals SUM (e.g., block 174). The registers 146 may then receive, store, and present the signals SUM. Here, each signal SUM contains a new pixel (e.g., $3/8*Y3_i+5/8*Y5_i$, where i indicates a particular pixel in the line Y). A concatenation of the new pixels presented by each circuit 140A–H may be used to present the signal NEW PIXELS (e.g., block 176). The signal NEW PIXELS may be presented to the output buffer 114 where the signal NEW PIXELS is added to the signal NEW FRAME (e.g., block 178).

A check may be made to determine if more pixels in the signal VIDEO FRAME need to be processed (e.g., decision block 180). If more pixels require processing (e.g., the YES branch from decision block 180) then the operation may continue with reading another pixel from the buffer and another coefficient from the coefficient memory 126 (e.g., block 158). If all of the pixels in the signal VIDEO FRAME have been processed (e.g., the NO branch of decision block 180) then the signal NEW FRAME may be complete and thus may be presented for display purposes (e.g., block 182).

The function performed by the flow diagram of FIG. 8 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, and magneto-optical disks, ROMs, RAMS, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

What is claimed is:

1. A circuit for freezing a video frame having a first field interlaced with a second field comprising:
    a memory configured to present a plurality of coefficient signals that define (i) a first coefficient set for said first field and (ii) a second coefficient set for said second field; and
    a filter configured to present a new frame in place of said video frame, wherein said new frame is generated from (i) said first field and said first coefficient set in response to freezing on said first field and (ii) said second field and said second coefficient set in response to freezing on said second field.

2. The circuit according to claim 1, wherein said filter is further configured to:
    buffer a plurality of pixel signals received from said first field in response to freezing on said first field;
    buffer said plurality of pixel signals received from said second field in response to freezing on said second field; and
    generate a plurality of new pixel signals from said plurality of pixel signals and a plurality of selected coefficient signals of said plurality of coefficient signals, wherein said plurality of new pixel signals form a portion of said new frame.

3. The circuit according to claim 2, wherein said filter is further configured to:
    present a first control signal to said memory to identify said plurality of selected coefficient signals; and
    present a second control signal to control generation of said plurality of new pixel signals.

4. The circuit according to claim 3, wherein said filter is further configured to:
    generate a plurality of product signals equal to said plurality of selected pixel signals multiplied by said plurality of selected coefficient signals respectively;
    generate a plurality of sum signals equal to a plurality of feedback signals added to said plurality of product signals respectively;
    store said plurality of sum signals;
    select said plurality of feedback signals from said plurality of sum signals and a constant signal; and
    present said plurality of sum signals as said plurality of new pixel signals.

5. The circuit according to claim 4, wherein (i) said filter is further configured to present a third control signal, and (ii) said plurality of feedback signals are selected in accordance with said third control signal.

6. The circuit according to claim 1, wherein an object presented in said new frame is vertically shifted a fraction of a horizontal line as compared to said object as presented in said video frame.

7. The circuit according to claim 1, wherein said filter comprises:
    a filter input configured to receive a plurality of pixel signals from (i) said first field in response to freezing on said first field and (ii) said second field in response to freezing on said second field;
    a buffer configured to (i) buffer said plurality of pixel signals received at said filter input and (ii) present said plurality of pixel signals in response to buffering; and
    a plurality of second circuits each configured to present a new pixel signal generated from a selected pixel signal of said plurality of pixel signals presented by said buffer and a selected coefficient signal of said plurality of coefficient signals, wherein each new pixel signal forms a portion of said new frame.

8. The circuit according to claim 7, wherein said filter further comprises a controller configured to present (i) a first control signal to said memory to identify said selected coefficient signal and (ii) a second control signal to said plurality of second circuits to control each said generation of said new pixel signal.

9. The circuit according to claim 8, wherein each of said second circuits comprises:
    a multiplier configured to present a product signal equal to said selected pixel signal multiplied by said selected coefficient signal;
    an adder configured to present a sum signal equal to a feedback signal added to said product signal;
    a register configured to (i) store said sum signal and (ii) present said sum signal as said new pixel signal; and
    a multiplexer configured to present said feedback signal selected from said sum signal and a constant signal in accordance with said second control signal.

10. The circuit according to claim 9, wherein (i) said controller is further configured to present a third control signal to an input multiplexer and (ii) said filter further comprises said input multiplexer configured to present said plurality of pixel signals selected from said buffer and said filter input in accordance to said third control signal.

11. The circuit according to claim 1, wherein said first coefficient set is different than said second coefficient set.

12. A method for freezing a video frame having a first field interlaced with a second field comprising the steps of:
    (A) storing a plurality of coefficient signals that define (i) a first coefficient set for said first field and (ii) a second coefficient set for said second field;
    (B) generating a new frame in response to step (A), wherein said new frame is generated from (i) said first field and said first coefficient set in response to freezing on said first field and (ii) said second field and said second coefficient set in response to freezing on said second field; and
    (C) presenting said new frame in place of said video frame.

13. The method according to claim 12, wherein step (B) further comprises the sub-steps of:
    buffering a plurality of pixel signals received from said first field in response to freezing on said first field;
    buffering said plurality of pixel signals received from said second field in response to freezing on said second field; and
    generating a plurality of new pixel signals from said plurality of pixel signals and a plurality of selected coefficient signals of said plurality of coefficients, wherein said plurality of new pixels form a portion of said new frame.

14. The method according to claim 13, wherein step (B) further comprises the sub-steps of:
    presenting a first control signal to identify said plurality of selected coefficient signals; and
    presenting a second control signal to control said generation of said plurality of new pixel signals.

15. The method according to claim 14, wherein step (B) further comprises the sub-steps of:

generating a plurality of product signals equal to said plurality of selected pixel signals multiplied by said plurality of selected coefficient signals respectively;

generating a plurality of sum signals equal to a plurality of feedback signals added to said plurality of product signals respectively;

storing said plurality of sum signals;

selecting said plurality of feedback signals from said plurality of sum signals and a constant signal; and presenting said plurality of sum signals as said plurality of new pixel signals.

16. The method according to claim 15, wherein step (B) further comprises the sub-step of presenting a third control signal, wherein said step of selecting said plurality of feedback signals is responsive to said third control signal.

17. The method according to claim 12, wherein an object presented in said new frame is vertically shifted a fraction of a horizontal line as compared to said object as presented in said video frame.

18. A circuit for freezing a video frame having a first field interlaced with a second field comprising:

means for storing a plurality of coefficient signals defining (i) a first coefficient set for said first field and (ii) a second coefficient set for said second field; and means for presenting a new frame in place of said video frame, wherein said new frame is generated from (i) said first field and said first coefficient set in response to freezing on said first field and (ii) said second field and said second coefficient set in response to freezing on said second field.

* * * * *